(12) United States Patent
Schmidt et al.

(10) Patent No.: US 10,625,766 B2
(45) Date of Patent: Apr. 21, 2020

(54) STEERING WHEEL FOR CONTROLLING STEERING MOVEMENT OF A VEHICLE

(71) Applicant: Bayerische Motoren Werke Aktiengesellschaft, Munich (DE)

(72) Inventors: Roland Schmidt, Stockdorf (DE); Hubert Scholz, Munich (DE); Uwe Boettcher, Germering (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/223,837

(22) Filed: Dec. 18, 2018

(65) Prior Publication Data

US 2019/0118851 A1  Apr. 25, 2019

Related U.S. Application Data

(63) Continuation of application No. PCT/EP2017/066735, filed on Jul. 5, 2017.

(30) Foreign Application Priority Data

Aug. 23, 2016 (DE) .................. 10 2016 215 843

(51) Int. Cl.
*B62D 1/08* (2006.01)
*B62D 5/04* (2006.01)

(52) U.S. Cl.
CPC .................. *B62D 1/08* (2013.01); *B62D 5/04* (2013.01)

(58) Field of Classification Search
CPC ... B62D 1/08; B62D 1/10; B62D 1/04; B62D 1/06; B62D 1/18; B62D 5/04
See application file for complete search history.

(56) References Cited

U.S. PATENT DOCUMENTS

| 1,487,638 A * | 3/1924 | Williams ................. B62D 1/08 |
| | | 74/555 |
| 2003/0066379 A1 | 4/2003 | Kobayashi et al. |
| 2008/0011118 A1 | 1/2008 | Meissner et al. |
| 2016/0083002 A1 | 3/2016 | Lin et al. |

FOREIGN PATENT DOCUMENTS

| CN | 103057579 A * | 4/2013 | |
| DE | 19701503 C1 * | 6/1998 | ........... B60R 21/203 |
| DE | 102 47 370 A1 | 6/2003 | |
| DE | 10 2004 046 321 A1 | 4/2006 | |

(Continued)

OTHER PUBLICATIONS

EPO Translation of the Description of KR 1020070062114 A, Kim, Jun. 15, 2007. (Year: 2019).*

(Continued)

*Primary Examiner* — Daniel D Yabut
(74) *Attorney, Agent, or Firm* — Crowell & Moring LLP

(57) ABSTRACT

A steering wheel for controlling steering movement of a vehicle has a steering wheel hub for mounting the steering wheel on a vehicle, a steering wheel rim, and at least two spokes, which connect the steering wheel rim to the steering wheel hub. The spokes can be telescoped by a drive and the steering wheel rim can thereby be slid relative to the steering wheel hub toward the axis of rotation of the steering wheel. The drive has a single drive motor for controlling at least two spokes.

8 Claims, 3 Drawing Sheets

(56) References Cited

FOREIGN PATENT DOCUMENTS

| DE | 10 2006 006 995 A1 | 8/2007 |
|---|---|---|
| GB | 357614 A | 9/1931 |
| GB | 468489 A | 7/1937 |
| KR | 10-2007-0062114 A | 6/2007 |

OTHER PUBLICATIONS

EPO Translation of the Description of CN 103057579 A, Jun. 15, 2007. (Year: 2019).*

International Search Report (PCT/ISA/210) issued in PCT Application No. PCT/EP2017/066735 dated Sep. 11, 2017 with English translation (five (5) pages).

German-language Written Opinion (PCT/ISA/237) issued in PCT Application No. PCT/EP2017/066735 dated Sep. 11, 2017 (three (3) pages).

German-language Search Report issued in counterpart German Application No. 10 2016 215 843.0 dated Apr. 20, 2018 with (seven (7) pages).

\* cited by examiner

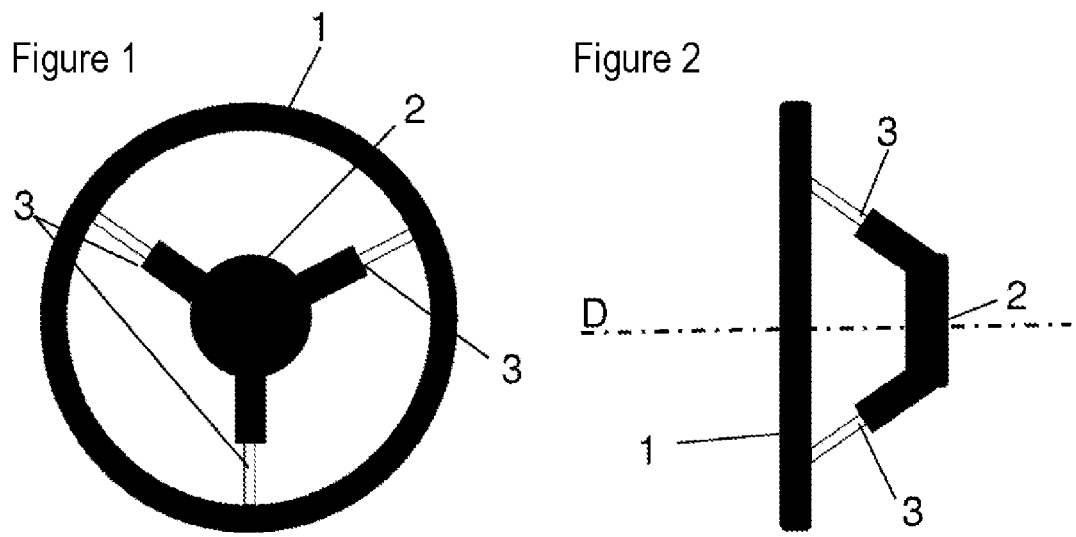
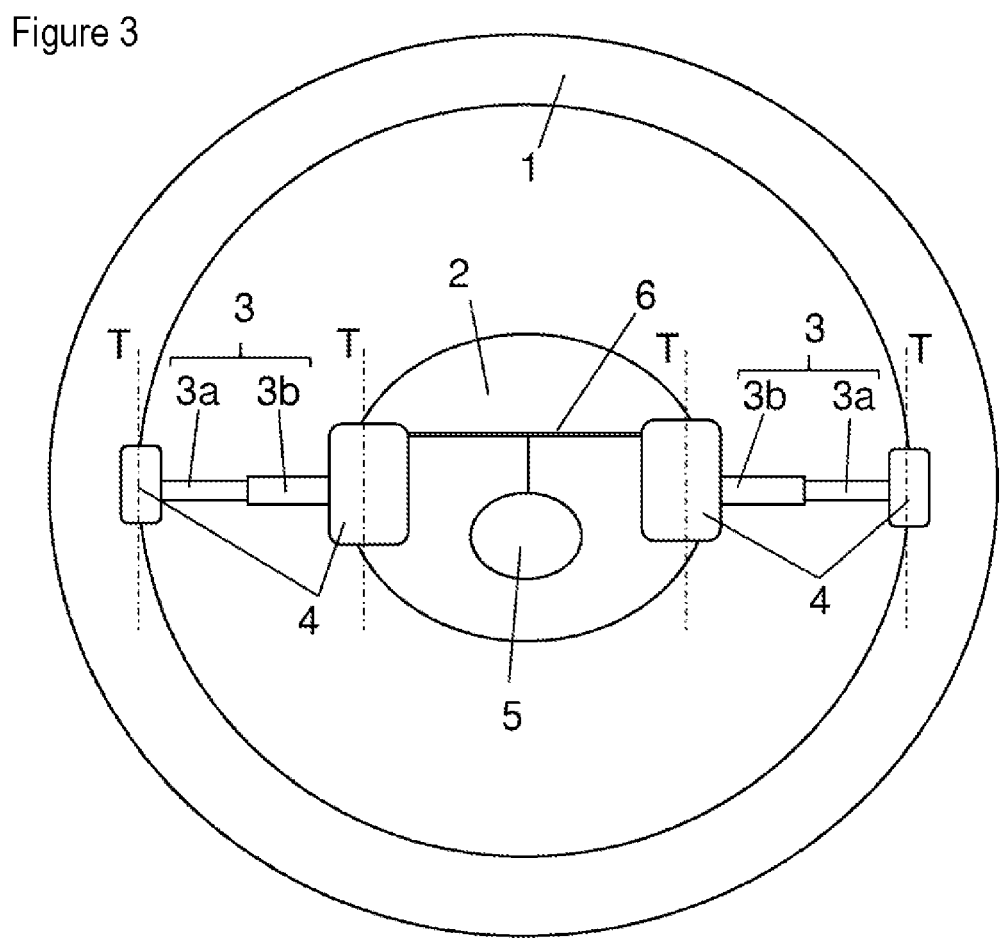

STEERING WHEEL FOR CONTROLLING STEERING MOVEMENT OF A VEHICLE

CROSS REFERENCE TO RELATED APPLICATIONS

This application is a continuation of PCT International Application No. PCT/EP2017/066735, filed Jul. 5, 2017, which claims priority under 35 U.S.C. § 119 from German Patent Application No. 10 2016 215 843.0, filed Aug. 23, 2016, the entire disclosures of which are herein expressly incorporated by reference.

BACKGROUND AND SUMMARY OF THE INVENTION

The invention relates to a steering wheel for actuating a steering movement of a vehicle. With respect to the prior art, by way of example, reference is made to GB 357 614 A, GB 468 489 A and, in particular, to DE 10 2004 046 321 A1.

Conventional steering wheels which are currently used in vehicles, in particular in motor vehicles, can be adjusted in the direction of the steering wheel column axis to an optimum steering wheel position via a steering wheel column, on which the steering wheel is mounted, for adaptation to different body sizes of the vehicle drivers. The height and length adjusting apparatus of the steering wheel column is usually integrated into the steering wheel column housing here. The positional adaptation takes place either manually or with the aid of electric motors, spindles, a gearwheel mechanism or rotary closures.

Here, the steering wheel itself usually comprises a steering wheel hub and a steering wheel rim, and spokes which connect the two. In addition to flat steering wheels, dished steering wheels are also known from the prior art. Said dished steering wheels are distinguished by the fact that the steering wheel hub is spaced apart from the steering wheel rim, as viewed along the steering wheel column axis. Here, the spokes accordingly run not only in the radial direction, as is the case in flat steering wheels, but rather also in the axial direction of the steering wheel or the steering wheel column, for which reason the steering wheel is of dished configuration.

This positional adjustment of the steering wheel column, which is also known under the designation of a telescopic steering wheel column, can take place, as has already been described, either manually or with the aid of suitable actuators such as, for example, an electric motor.

It is a disadvantage of the telescopic steering wheel columns, however, that they take up a large amount of installation space and do not provide the required flexibility with regard to future driving concepts, such as, for example, autonomous driving.

In addition to the described concept of telescopic steering wheel columns, steering wheels are also known, in the case of which the adaptation of the spacing between the upper body and the steering wheel rim can be set by way of adjustment of the spacing between the steering wheel hub and the steering wheel rim. For example, GB 357 614 A and GB 468 489 A describe a dished steering wheel, in the case of which the spokes can be telescoped, and therefore the spacing between the steering wheel hub and the steering wheel rim can be set individually as desired. Whereas said setting takes place manually in the case of the two last-mentioned documents, DE 10 2004 046 321 A1 proposes a steering wheel, in the case of which at least one section of the steering wheel rim can be adjusted in its position with respect to a steering wheel main body by means of an adjusting mechanism, more precisely by means of a drive.

It is a disadvantage of said prior art, however, that the use of one drive per spoke entails an increased installation space requirement. This is because there is only a small amount of installation space for the integration of further components, in particular, in the steering wheel region, on account of the necessary integration of safety components, such as, for example, an airbag.

It is therefore an object of the invention to provide a steering wheel which makes a comfortable adjusting mechanism for adaptation to body sizes possible, it being possible for the adjusting mechanism to be integrated into the steering wheel in as satisfactory a way as possible and using a small amount of required installation space.

The object is achieved by way of a steering wheel for actuating a steering movement of a vehicle in accordance with embodiments of the invention.

A steering wheel is proposed which, in addition to a steering wheel hub for mounting the steering wheel on a vehicle, comprises a steering wheel rim and at least two spokes which connect the steering wheel rim to the steering wheel hub. The spokes can be telescoped by use of a suitable drive, it being possible for the steering wheel rim to be displaced with respect to the steering wheel hub in the direction of the rotational axis of the steering wheel. According to the invention, the drive comprises a single drive motor for actuating at least two spokes.

Here, the telescopic steering wheel spokes make an axial displacement (that is to say, as viewed in the direction of the rotational axis of the steering wheel) of the steering wheel rim with respect to the steering wheel hub possible. A radial displacement or length change of the steering wheel spokes is preferably not provided on account of the rigid geometry of the steering wheel rim.

In one preferred embodiment of the invention, each spoke in each case comprises a movable part segment and in each case a fixed part segment. Here, the two part segments are preferably arranged inside one another, it being possible for the movable part segment of the spoke to be telescoped or displaced or moved in each case relative to the fixed part segment of the spoke.

For example, three spokes of the stated type can be arranged between the steering wheel rim and the steering wheel hub, which spokes for their part are preferably configured in a tube-like manner or in the form of a hub cylinder.

In a further preferred refinement of the invention, the spokes (or at least two spokes) are connected in each case pivotably to the steering wheel rim and to the steering wheel hub. Here, the fixed part segment of each spoke is preferably connected pivotably to the steering wheel hub, and the movable part segment of each spoke is connected pivotably to the steering wheel rim. The respective part segments can thus be attached, for example, by way of a rotary joint or a hinge to the steering wheel rim and to the steering wheel hub. Here, the rotational axis of the pivotable connection runs in the direction of a tangent of the virtual turning circle of the steering wheel. The system is statically defined by way of said pivotable connection of the respective part segments of a spoke, it being possible for a space change between the steering wheel hub and the steering wheel rim in the direction of the rotational axis of the steering wheel to be made possible by way of the extension or shortening of the spokes.

In a preferred embodiment of the invention, the drive motor for bringing about a length change of at least two spokes is arranged in the steering wheel hub. From there, the drive motor can then actuate or drive at least two of the spokes for the length change.

Here, the at least two spokes which are actuated by the drive motor are preferably coupled to the drive motor by a coupling apparatus. A coupling apparatus of this type ensures a synchronized length change of the at least two spokes. Accordingly, at least two (preferably three) spokes are coupled to one another in such a way that their length change is always identical.

The coupling apparatus can be realized here in different ways.

A first possibility of coupling the spokes of the steering wheel to the drive motor and at the same time of ensuring a synchronized length change is the use of a coupling rod. A coupling rod of this type can be arranged, for example, on the rotary joints or on the hinges which connect the steering wheel hub to one of the two part segments of the spoke. In the case of the configuration of, for example, two spokes on a steering wheel, the coupling rod can be connected fixedly at one end to the rotary joint of the first spoke and at the other end to the rotary joint of the second side. The attachment point of the ends of the coupling rod on the rotary joints is preferably arranged eccentrically and at different points of the two rotary joints. Thus, for example, the attachment point of the one end of the coupling rod can be arranged eccentrically on the first rotary joint and (as viewed in the vehicle vertical direction) above the rotational axis thereof, and the other end of the coupling rod can be arranged eccentrically on the other rotary joint and (as viewed in the vehicle vertical direction) below the rotational axis thereof. Here, the drive motor can be arranged on one of the rotary joints and can drive only one of the spokes. In the case of a length change of the first spoke, which length change is brought about by the drive motor, the first steering wheel hub-side rotary joint of said first spoke rotates. By way of a described coupling to the steering wheel hub-side rotary joint of the other spoke, this also rotates, for which reason the rotary angle of the two spokes changes synchronously. A simultaneous and uniform length change of the spokes with respect to one another can be realized in a simple manner by way of the mechanical coupling of the rotary joints by way of a coupling rod. Here, the coupling of the spokes by means of the principle of said coupling rod is in no way restricted to two spokes, but rather can likewise be applied in the case of more than two spokes by way of a minor structural change.

A second possibility for configuring the coupling apparatus is the use of a flexible shaft. Flexible or pliable shafts of this type are known in the automotive sector, for example, in the case of the adjustment of seat positions, filler caps, handbrake cables and much more. They represent flexible connecting elements for the radial electromechanical transmission of force. Here, for example, a flexible shaft of this type can be coupled directly to the drive motor and the spokes. The flexible shaft can in turn (in the case of an embodiment having two spokes) be coupled by way of in each case one end, for example by way of a gearwheel or a bevel gear, to in each case one spoke, and can then drive said spoke in a synchronized manner. The rotational movement of the drive motor or its output shaft which, in this case, is coupled directly to the flexible shaft, can thus be converted by means of a suitable mechanism at the spokes into a synchronized translational movement of at least two spokes.

In another preferred embodiment of the invention, in addition to the two abovementioned possibilities, the coupling apparatus can be configured as a flexible drive mechanism. For example, it can be configured as a belt mechanism.

Here, it is possible, for example, that the drive motor drives a drive belt, which drive belt in turn transmits or introduces the force into the spoke in each case via a pinion or a bevel pinion. In the case of an embodiment of the invention with more than two spokes, for example in the case of three spokes, the output shaft of the drive motor can drive a first spoke directly, whereas the other two spokes are driven by means of said drive belt with the aid of a toothed belt pulley.

For the transmission of the force or the movement from the drive belt or from the flexible drive mechanism to the respective spokes, for example, the bevel pinion or else a spur pinion can be used depending on the embodiment of the telescopic spokes.

It is provided in one preferred embodiment of the invention to couple the coupling apparatus to a spindle thread which is arranged on the spokes of the steering wheel. In the case of said embodiment of the spokes, it is preferred that the coupling apparatus, that is to say, for example, the drive belt, drives in each case one bevel pinion per spoke. The rotational axis of the bevel pinion then corresponds to the rotational axis of the steering wheel hub-side rotary joint or hinge. The rotational movement of the bevel pinion can be transmitted to a bevel gear which is in turn connected fixedly to a spindle in the spoke of the steering wheel. Depending on the rotational direction of the bevel pinion, the movable part segment of the spoke can thus be moved or shifted relative to the fixed part segment of the spoke away from the latter or into the latter. This displacement thus advantageously brings about a change in the spacing between the steering wheel rim and the steering wheel hub.

As an alternative to the last-mentioned embodiment, a spur pinion can likewise be used instead of the bevel pinion, in the case of which spur pinion the rotational axis likewise corresponds to that of the steering wheel hub-side rotary joint or hinge.

In a further preferred embodiment of the invention, the coupling apparatus is coupled to a flexible drive mechanism which is arranged on the spokes, that is to say, for example, a belt. Here, the spur pinion can once again drive a belt which is arranged in the fixed part segment (that is to say, that one which is connected, for example, to the steering wheel hub) of the spoke. By use of a suitable transmission apparatus, such as, for example, a toothed pinion, the movable part segment can then be driven or moved, for example, by means of a rack. Depending on the rotational direction, the fixed part segment of the spoke can thus be moved into the movable part segment or out of the latter.

Instead of the last-mentioned belt-driven toothed pinion, a belt which is toothed on both sides is likewise conceivable, the outer toothing system of which belt engages directly into that of the rack.

An electromechanical adjustment of the steering wheel with only one drive motor can also be achieved in a mechanically simple way in the case of said embodiment of the invention.

A further advantage of the technology according to the invention is that the length-adjustable telescopic spokes can be used in addition to an existing length adjustment via the steering wheel column, the axial adjusting travel being increased, and it being possible for the adaptation to different body sizes or body dimensions to be set in a more individual manner. As a result, ergonomic and health advantages can be achieved for the vehicle driver during driving.

In the case of the use of the construction according to the invention as a sole axial positioning possibility of the steering wheel, the length adjusting mechanism in the steering wheel column housing can be dispensed with. The housing can therefore be of more space-saving design, which in turn has a positive effect on the freedom of movement of the driver. With regard to possible future technologies such as, for example, autonomous driving, in the case of which the steering wheel is then only to be used optionally, the steering wheel according to the invention and the associated enlarged passenger compartment are of great advantage. In addition, a simpler folding-out or extending mechanism of the steering wheel is possible.

Regardless of future technologies, the increased installation space which is associated with the technology according to the invention can be utilized for the integration of other components, such as, for example, a head up display.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 and FIG. 2 show an embodiment of a steering wheel according to the invention in a plan view and in a side view, respectively.

FIG. 3 and FIG. 4 in each case show a further embodiment of a steering wheel according to the invention with its components.

DETAILED DESCRIPTION OF THE DRAWINGS

Figure 4:
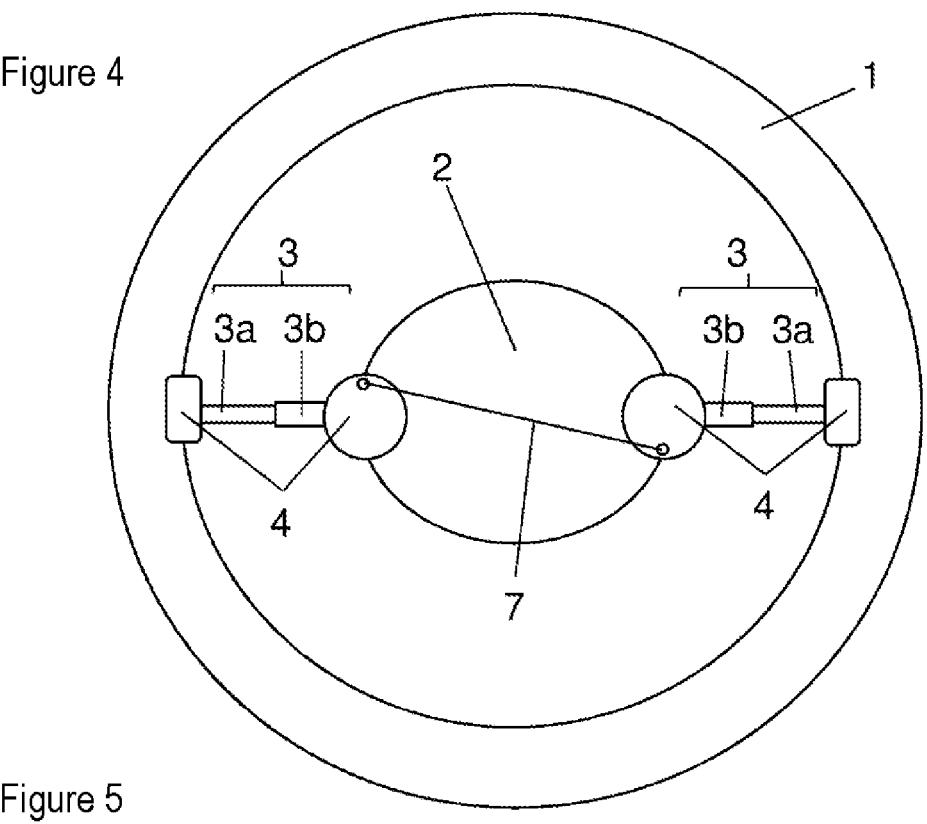

FIG. 1 shows one exemplary embodiment of a steering wheel according to the invention in a plan view. Here, the steering wheel comprises a steering wheel rim 1 and a steering wheel hub 2 which mounts the steering wheel on a vehicle (not shown). In this specific example, the steering wheel hub 2 and the steering wheel rim 1 are connected to one another via three telescopic spokes 3. The telescopic spokes 3 (also called telescope spokes) make it possible to displace the steering wheel rim 1 with respect to the steering wheel hub 2 in the direction of the rotational axis D of the steering wheel. FIG. 2 shows another exemplary embodiment of a steering wheel according to the invention in a side view, in which figure the rotational axis D of the steering wheel can be seen. In this example, the steering wheel comprises two telescopic spokes 3. In addition, it can be seen that the steering wheel is of dished construction, that is to say the steering wheel hub 2 and the steering wheel rim 1 are spaced apart from one another axially (as viewed along the rotational axis D of the steering wheel), with the result that, together with the spokes 3, they define a dish-like shape.

FIG. 3 shows a further exemplary embodiment of a steering wheel according to the invention having two telescopic spokes 3 in a plan view. Here, the necessary components for the length adjustment of the spokes 3 are shown within the steering wheel. This is a diagrammatic drawing, it being possible for some of the components which are mentioned in the following text to be situated in the interior of the steering wheel in one real exemplary embodiment of the invention and to not be visible in the case of an external view of the steering wheel.

The spokes 3 can be telescoped or adjusted in terms of their length in such a way that the axial spacing, as viewed along the steering wheel rotational axis D, between the steering wheel rim 1 and the steering wheel hub 2 can be adapted or changed. In order to statically define the overall movement system and to make the axial adjustment of the spokes 3 possible, the spokes 3 are mounted pivotably at the two ends on the steering wheel rim 1 and on the steering wheel hub 2 in each case by way of a rotary joint 4 which is indicated merely diagrammatically in this drawing. Here, the rotational axis T of the rotary joints 4 runs in the direction of a tangent of the (not shown or virtual) turning circle of the steering wheel. In order to ensure a length adjustment or a telescoping capability of the spokes 3, each spoke 3 in each case comprises a fixed part segment 3b and a movable part segment 3a which can be displaced relative to the former. Here, the fixed part segment 3b is connected to the steering wheel hub 2 via a rotary joint 4, and the movable part segment 3a is connected to the steering wheel rim 1 via a further rotary joint 4. A drive is provided for carrying out the length adjustment of the spokes 3. According to the invention, the drive comprises a single drive motor 5 for actuating at least two spokes 3. In this specific example, the drive motor 5 is arranged in the steering wheel hub 2. For the uniform transmission of the force to the two spokes 3 and for the synchronization of the rotary angle of the rotary joints 4 of the spokes 3 (and therefore for making an identical or identically great length adjustment of the two spokes 3 possible), the spokes 3 are coupled to the drive motor 5 by way of a coupling apparatus 6.

Here, the coupling apparatus 6 can be configured in different ways.

A first example for configuring the coupling apparatus 6 is shown by FIG. 4. Here, the coupling apparatus 6 from FIG. 3 is configured as a coupling rod 7. The coupling rod 7 is connected fixedly by way of, in each case, one end to, in each case, one steering wheel hub-side rotary joint 4 of the spokes 3. Here, the coupling rod 7 is connected to the rotary joints 4 in such a way that the rotary angle of the two rotary joints is synchronized in the case of rotation of one of the two rotary joints with respect to the other. If therefore, for example, the steering wheel hub-side rotary joint 4 of one of the two spokes 3 rotates, the rigid connection of the coupling rod 7 to the steering wheel hub-side rotary joint 4 of the other spoke 3 likewise brings about a rotational movement of the latter. The two spokes 3 thus always have the same length adjustment travel. The drive motor 5 which is not shown in FIG. 4 can be arranged, for example, in the steering wheel hub 2 in the immediate vicinity of one of the steering wheel hub-side rotary joints 4, and can actuate one of the two spokes 3.

Figure 5:
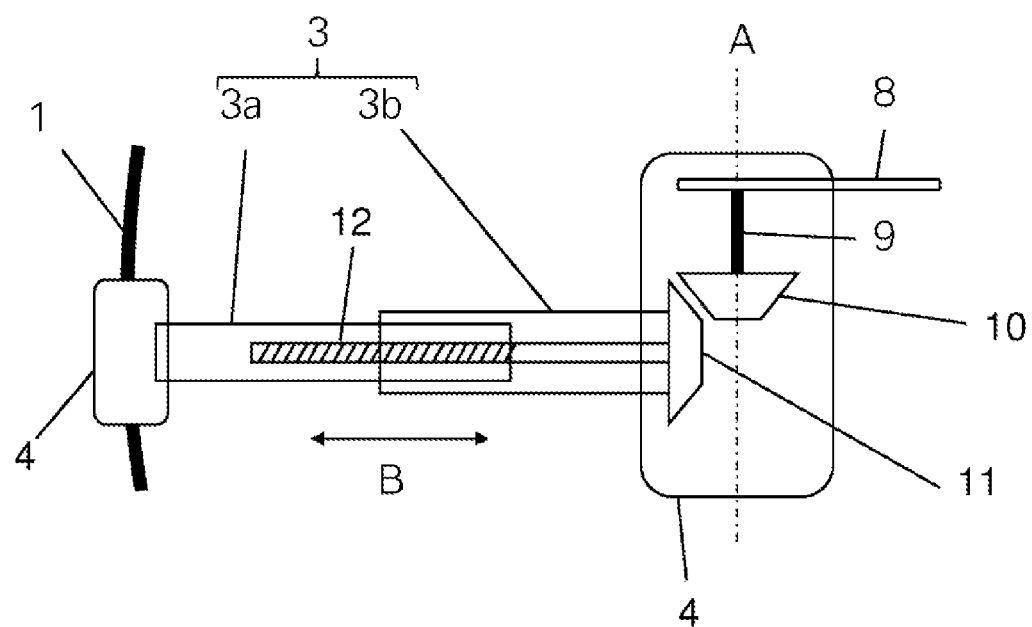
FIG. 5, FIG. 6 and FIG. 7 show detailed views of technical exemplary embodiments of a spoke of a steering wheel according to the invention.
Figure 6:
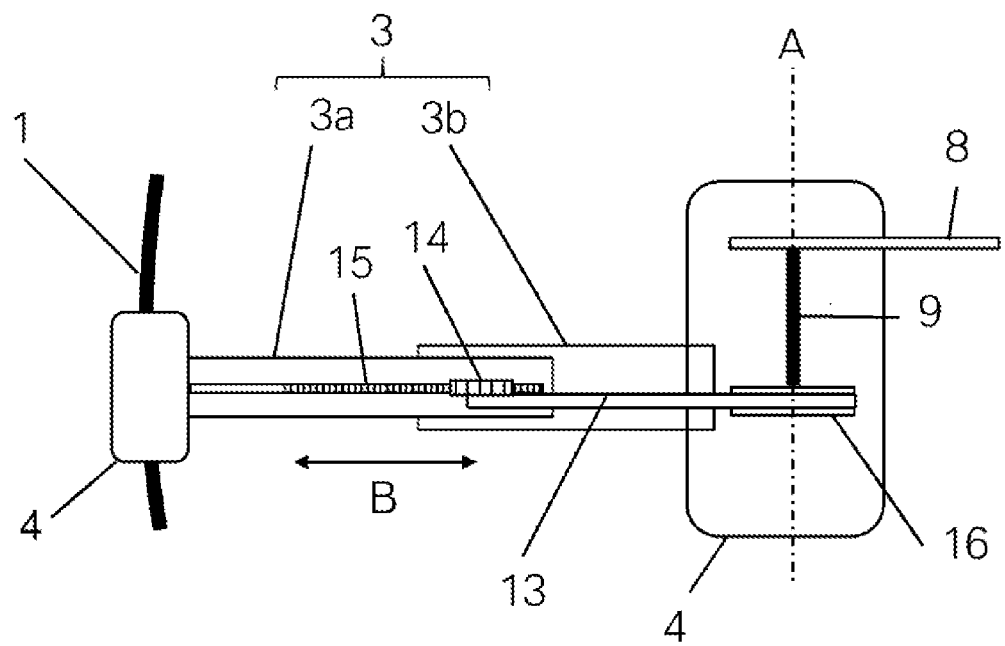
Figure 7:
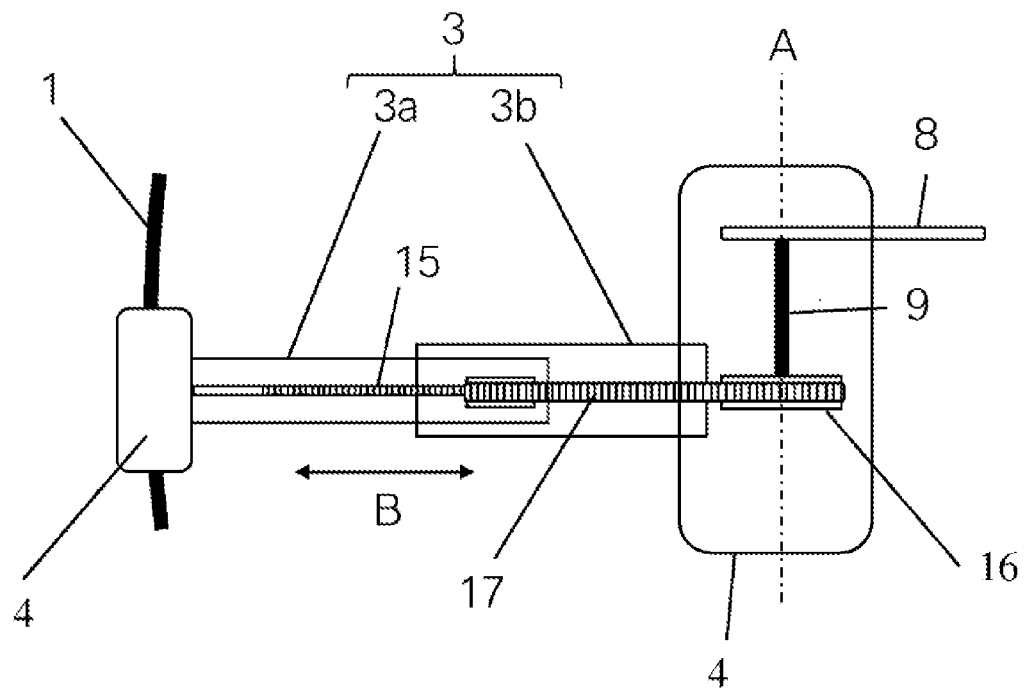

A further embodiment for configuring the coupling apparatus 6 for synchronizing the length adjustment travels of the spokes 3 is the use of a flexible drive mechanism or a drive belt 8, only part of which is shown in FIGS. 5-7. In the case of the configuration of more than two spokes, for example three spokes 3, one spoke can be actuated directly by the drive motor by a suitable transmission member, for example a pinion, whereas the other two spokes 3 are driven or actuated via the drive belt 8 with the aid of a toothed belt pulley (not shown).

FIGS. 5 to 7 in each case show possible embodiments of the transmission of movement or force from the coupling apparatus 6 or from a drive belt 8 to the spokes 3 for carrying out an adjusting operation of the spokes. These embodiments are shown in a detailed view of a single spoke 3 in a plan view, which spoke 3, as has already been described, is mounted pivotably by means of a rotary joint 4 in each case on the steering wheel hub 2 and on the steering wheel rim 1, and which spoke 3 comprises a movable part segment 3a and a fixed part segment 3b. It is provided that other (or at least one further) spokes 3 (not shown in FIGS. 5-7) of a steering wheel according to the invention have an identical construction or configuration as that described in the following text.

FIG. 5 shows a spoke 3, in the case of which the transmission of force or the transmission of movement takes place from the drive belt 8 via a shaft 9 to a bevel pinion 10. The bevel pinion 10 transmits the rotational movement to a bevel gear 11 which is connected fixedly to a spindle 12 in the spoke 3. Here, the rotational axis of the bevel pinion 10 corresponds to the rotational axis of the steering wheel hub-side rotary joint 4. The rotational movement of the spindle 12 brings about a translational movement B of the movable part segment 3a of the spoke 3.

FIG. 6 shows a further embodiment for the transmission of force or the transmission of movement from the coupling apparatus 6 or a drive belt 8 to a spoke 3. Here, the drive belt 8 drives a pinion 16 or a spur pinion 16 via a shaft 9, which pinion 16 itself in turn transmits the movement or the force to a belt 13 which is situated in the fixed part segment 3b of the spoke 3. The belt 13 transmits its movement to a toothed pinion 14 which is arranged at that end of the fixed part segment 3b of the spoke 3 which faces away from the steering wheel hub 2. The toothed pinion 14 subsequently engages into a rack 15 which is arranged on the movable part segment 3a of the spoke. As a result, the movable part segment 3a is displaced with a translational movement B with respect to the fixed part segment 3b of the spoke 3.

As an alternative to the belt-driven toothed pinion 14 which is shown in FIG. 6, a belt 17 which is toothed on both sides and the outer toothing system of which engages directly into the toothing system of the rack 15 can likewise be used, as shown in FIG. 7.

LIST OF DESIGNATIONS

1 Steering wheel rim
2 Steering wheel hub
3 Spoke
3a Movable part segment of the spoke
3b Fixed part segment of the spoke
4 Rotary joint
5 Drive motor
6 Coupling apparatus
7 Coupling rod
8 Drive belt
9 Shaft
10 Bevel pinion
11 Bevel gear
12 Spindle
13 Belt
14 Gearwheel
15 Rack
16 Pinion
17 Double-sided toothed belt
D Rotational axis of the steering wheel The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A steering wheel for actuating a steering movement of a vehicle, comprising:
   a steering wheel hub for mounting the steering wheel on a vehicle;
   a steering wheel rim;
   at least two spokes which connect the steering wheel rim to the steering wheel hub; and
   a drive by which the spokes are telescoped, wherein
   the steering wheel rim is displaceable in a direction of a rotational axis of the steering wheel with respect to the steering wheel hub,
   the drive comprises a single drive motor for actuating the at least two spokes, and
   each of the at least two spokes includes a fixed part segment and a movable part segment, wherein the fixed part segment is connected pivotably to the steering wheel hub at a first end by a first rotary joint, wherein the movable part segment is connected pivotably to the steering wheel rim at a first end by a second rotary joint, wherein a second end of the movable part segment is received within a second end of the fixed part segment and is translationally movable within the second end of the fixed part segment.

2. The steering wheel as claimed in claim 1, wherein the drive motor is arranged in the steering wheel hub.

3. The steering wheel as claimed in claim 1, wherein the at least two spokes are coupled to the drive motor by way of a coupling apparatus.

4. The steering wheel as claimed in claim 3, wherein the coupling apparatus is a coupling rod.

5. The steering wheel as claimed in claim 3, wherein the coupling apparatus is a flexible shaft.

6. The steering wheel as claimed in claim 3, wherein the coupling apparatus is a flexible drive mechanism.

7. The steering wheel as claimed in claim 3, wherein the coupling apparatus is coupled by way of a spindle thread to the spokes.

8. The steering wheel as claimed in claim 3, wherein the coupling apparatus is coupled by way of a flexible drive mechanism to the spokes.

* * * * *